(12) United States Patent
Carroll et al.

(10) Patent No.: US 6,207,053 B1
(45) Date of Patent: Mar. 27, 2001

(54) THERMOPLASTIC, UNIBODY TRANSFER DEVICE

(75) Inventors: Robert H. Carroll, Rock Hill, SC (US); Linus I. Holstein, Pineville, NC (US); Charles J. Runkle, Charlotte, NC (US); Richard A. Sodaro, Weddington, NC (US); Tony R. Vido, Belmont, NC (US); Martin J. Weinstein, Charlotte, NC (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 09/206,351

(22) Filed: Dec. 7, 1998

Related U.S. Application Data

(63) Continuation-in-part of application No. 09/041,386, filed on Mar. 12, 1998.

(51) Int. Cl.[7] .................................................. B01D 39/00
(52) U.S. Cl. ................. 210/500.23; 156/294; 156/304.3; 156/304.6
(58) Field of Search .............................. 156/304.1, 304.2, 156/304.3, 304.4, 304.5, 304.6, 304.7, 293, 294, 296; 261/104; 96/10; 210/500.23

(56) References Cited

U.S. PATENT DOCUMENTS

| | | | |
|---|---|---|---|
| 3,228,877 | * | 1/1966 | Mahon . |
| 4,038,190 | * | 7/1977 | Baudet et al. ................... 210/321 B |
| 4,839,037 | * | 6/1989 | Bertelsen . |
| 4,961,760 | | 10/1990 | Caskey et al. . |
| 5,174,900 | * | 12/1992 | Nichols . |
| 5,238,717 | * | 8/1993 | Boylan . |
| 5,264,171 | * | 11/1993 | Prasad . |
| 5,284,584 | * | 2/1994 | Huang . |
| 5,352,361 | * | 10/1994 | Prasad . |
| 5,489,352 | * | 2/1996 | Spearman . |
| 5,543,002 | * | 8/1996 | Brinda . |
| 5,637,224 | * | 6/1997 | Sirkar . |
| 5,695,702 | * | 12/1997 | Niermeyer . |
| 5,775,121 | * | 7/1998 | Kuma . |
| 5,881,775 | * | 3/1999 | Owen . |
| 5,916,647 | * | 6/1999 | Weinstein . |
| 5,972,230 | * | 10/1999 | Ely et al. . |
| 5,979,668 | * | 11/1999 | Kane et al. . |

FOREIGN PATENT DOCUMENTS

| | | |
|---|---|---|
| 1221644 | 5/1987 | (CA) . |
| 1307979 | * 9/1962 | (FR) . |
| 2610394 | 8/1988 | (FR) . |

OTHER PUBLICATIONS

European Search Report in EP 99 10 4710, dated Jul. 14, 2000.

* cited by examiner

*Primary Examiner*—Chester T. Barry
(74) *Attorney, Agent, or Firm*—Robert H. Hammer, III

(57) ABSTRACT

The present invention is directed to a thermoplastic, unibody transfer device. This transfer device includes a membrane, and a housing surrounding the membrane. The housing includes a thermoplastic end cap and a thermoplastic shell. The end cap and shell are butt welded together. Additionally, there is a method of manufacturing with the aforementioned device. The method includes forming a bundle of a membrane, inserting the bundle into a shell, butt welding an end cap to the bundle and the shell so that the cap, bundle, and shell are fused together.

5 Claims, 4 Drawing Sheets

THERMOPLASTIC, UNIBODY TRANSFER DEVICE

RELATED APPLICATION

This application is a continuation-in-part of copending application Ser. No. 09/041,386 filed Mar. 12, 1998.

FIELD OF THE INVENTION

The present invention is directed to a thermoplastic, unibody heat or mass transfer device and method of making same.

BACKGROUND OF THE INVENTION

A transfer device refers to a device that can be used in a mass transfer or a heat transfer application. The transfer device when used for mass transfer applications is referred to as a contactor, and when used for heat transfer applications, a heat exchanger.

A contactor is a mass transfer device that removes or adds a material to a fluid. Contactors may be used to remove or add gas to a fluid stream. Such devices are commercially available, for example, see LIQUI-CEL® contactor offered by CELGARD LLC, of Charlotte, N.C. The LIQUI-CEL contactor is assembled from several pieces that are sealed with a plurality of O-rings and then are mechanically fastened (e.g., clamped) together. This device works well, however, increased demand for these contactors requires that improvements be investigated and utilized. For example, elimination of the O-rings and clamps would be a savings in cost and assembly time and improve long term durability. On the other hand, the mere seal welding of the end caps to the shell, while eliminating the clamps, does not eliminate the O-rings, and therefore does not decrease cost and assembly time and may not improve long term operability. Additionally, contactor components (e.g., shell, end cap, center tube, microporous membranes and potting), are made from dissimilar materials that make joining a difficult problem. Furthermore, the external components are typically made of metal which increases the weight of the device.

A heat exchanger is a heat transfer device that removes or adds heat to a fluid. Heat exchangers, contemplated by the instant invention, are used in applications where temperatures must be below the softening point of the thermoplastic materials used in the device. One such application is in medical devices where fluids must be around body temperature. For example, in medical devices used in open heart surgeries, blood is passed outside the body, loses heat, and before re-entry must be warmed to body temperature. Heat exchangers used in this application are typically made of metal. While functionally they operate well, they pose a disposal problem because they can not be incinerated. On the other hand, a completely thermoplastic device can be incinerated.

Accordingly, there is a need for improved transfer devices and systems for manufacturing them.

SUMMARY OF THE INVENTION

The present invention is directed to a thermoplastic, unibody transfer device. This transfer device includes a membrane, and a housing surrounding the membrane. The housing includes a thermoplastic end cap and a thermoplastic shell. The end cap and shell are butt welded together. Additionally, there is a method of manufacturing the aforementioned device. The method includes forming a bundle of a membrane, inserting the bundle into a shell, butt welding an end cap to the bundle and the shell so that the cap, bundle, and shell are fused together.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
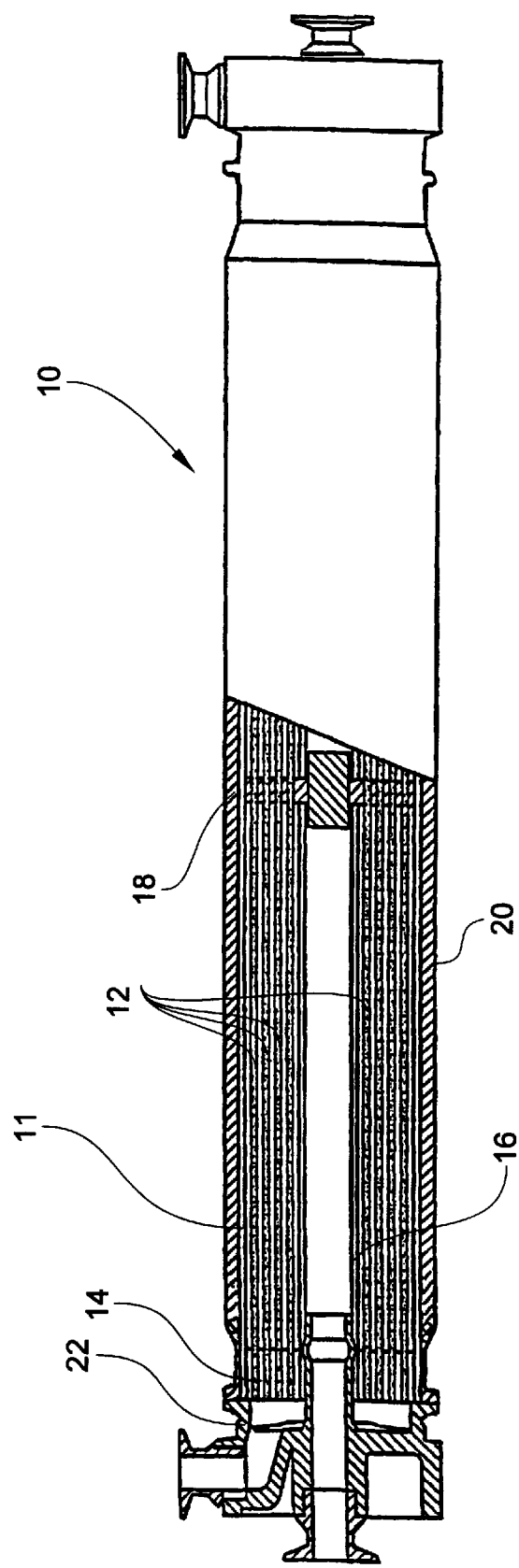
FIG. 1 is a plan view of a transfer device made according to the present invention, parts broken away for clarity.

Referring to the drawings wherein like numerals indicate like elements, there is shown, in FIG. 1, a thermoplastic, unibody transfer device 10. Thermoplastics, as used herein, refers to a high polymer that softens when exposed to heat and returns to its original condition when cooled to room temperature; the term is usually applied to synthetics such as polyvinyl chloride, nylons, fluorocarbons, linear polyethylene, polyurethane prepolymer, polystyrene, polypropylene, and cellulosic and acrylic resins. Exemplary thermoplastics include polyolefins, such as polypropylene and polyethylene. Unibody, as used herein, refers to a device that is made from several parts that are ultimately united, e.g., by welding, into a single unit. Welding or butt welding, as used herein, refers to a process for joining or uniting or fusing two or more components of the device, especially after rendering same soft or pasty (e.g., by heat); those components may or may not be made of dissimilar material. Butt weld is distinguished from a seal weld (seal weld, as used herein, refers to a small cross-sectional weld used primarily to secure tightness). In the butt weld process, the faces to be joined do not have to be bevelled, preferably no welding material (e.g., filler, welding wire or welding rod) is used, and preferably no glue nor adhesive is used. Instead, a hot plate welding technique, discussed below in detail, is preferred. Transfer device, as used herein, refers to a device for use in the unit operations of mass or heat transfer. A mass transfer device is also referred to as a contactor. A heat transfer device is also referred to as a heat exchanger. In the context of the present invention, the difference between the contactor and heat exchanger is found in the membrane. A membrane, as used herein, refers to a thin pliable sheet which may be either porous (e.g., microporous) or nonporous and which may be either a flat sheet or a hollow fiber. The contactor utilizes microporous membranes, where the heat exchanger utilizes a nonporous membrane. To simplify the following discussion only the contactor will be discussed in detail, it being understood by those of ordinary skill that the device and methods are equally applicable to the heat exchanger.

Contactor 10 comprises a microporous membrane unit 11 and a housing 18 and is free of O-rings and clamps. Microporous membrane unit 11 preferably comprises a fabric of microporous hollow fibers 12 wound around a dispersal channel 16 (e.g., perforated center tube) and the ends of the fibers are formed into a tube sheet 14 by use of a potting resin. The method of manufacturing the wound microporous membrane 11 is illustrated in U.S. Pat. No.

5,284,584, incorporated herein by reference. Housing 18 preferably comprises a shell 20 and an end caps 22. Further possible configurations of contactor 10 are shown in U.S. Pat. Nos. 5,264,171 and 5,352,361, incorporated herein by reference. In the preferred embodiment, most components are polypropylene, but the potting resin is polyethylene (except as otherwise noted below).

Figure 2:
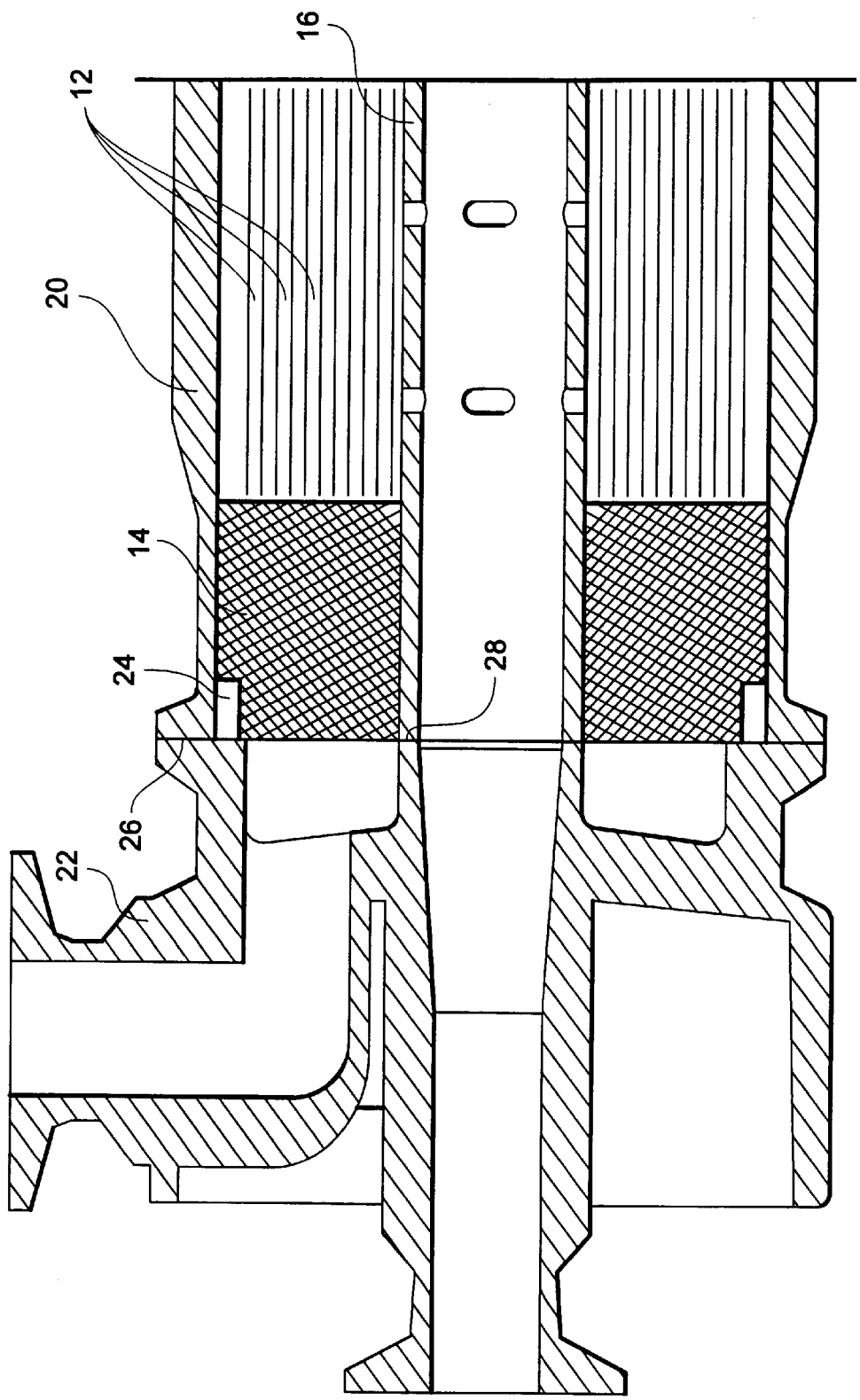
FIG. 2 is an enlarged sectional view of one end of the present invention.

Referring to FIG. 2, tube sheet 14 is preferably provided with a sealing ring 24 (or weld piece). During the welding operation, discussed in greater detail below, end cap 22 is welded to shell 20 and ring 24 at weld 26, and to tube 16 at weld 28. These welds are preferably along the entire mating faces of the components.

Sealing ring 24 is preferred but not essential. In the preferred embodiment, tube sheet 14 is formed from a polyethylene potting resin, whereas the shell 20, end caps 22 and tube 16 are made of polypropylene. The dissimilarities between these materials can make welding difficult. Therefore, to simply welding, sealing ring 24, which is preferably polypropylene, may be added onto sheet 14. Alternatively, the potting resin, which in U.S. Pat. No. 5,284,584 is illustrated as a polyethylene, may be changed to a polyethylene copolymer having better compatibility for welding. An example of such a copolymer is DOW 25445N, HDPE copolymer, commercially available from Dow Chemical Co. of Midland, Mich. In another alternative, the potting resin may be an epoxy that is compatible for welding.

Figure 3A:
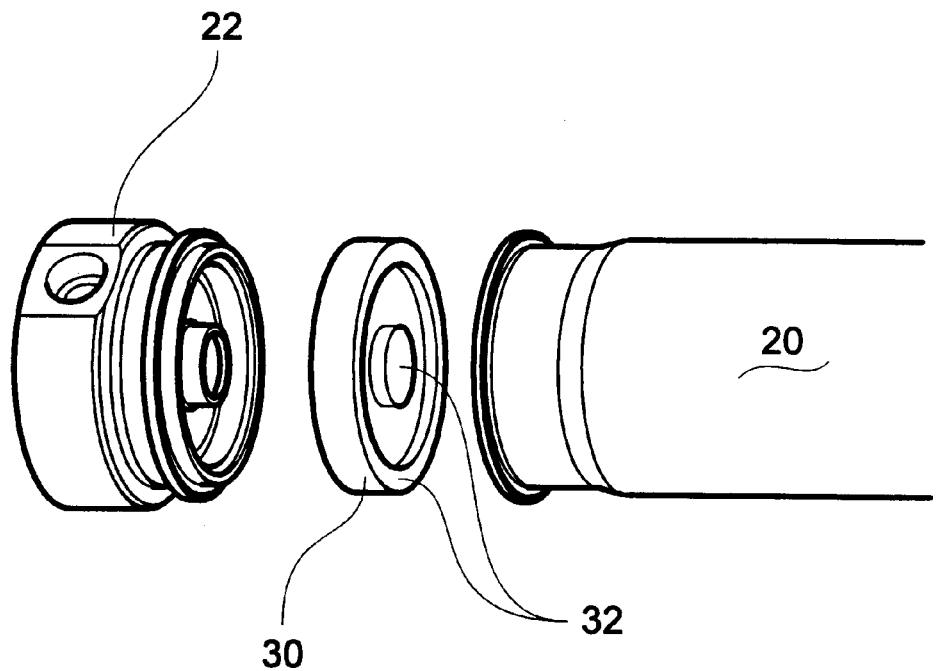
FIGS. 3(a–d) is an illustration of the steps in the methods of manufacturing.
Figure 3B:
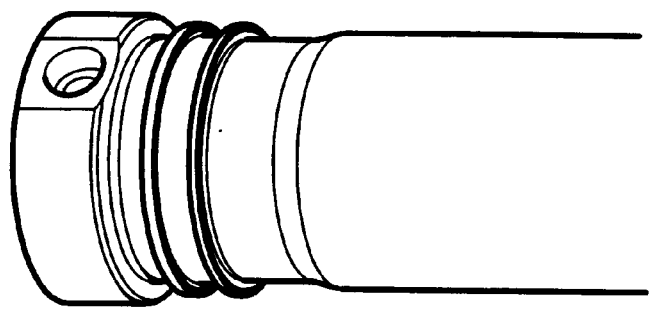
Figure 3C:
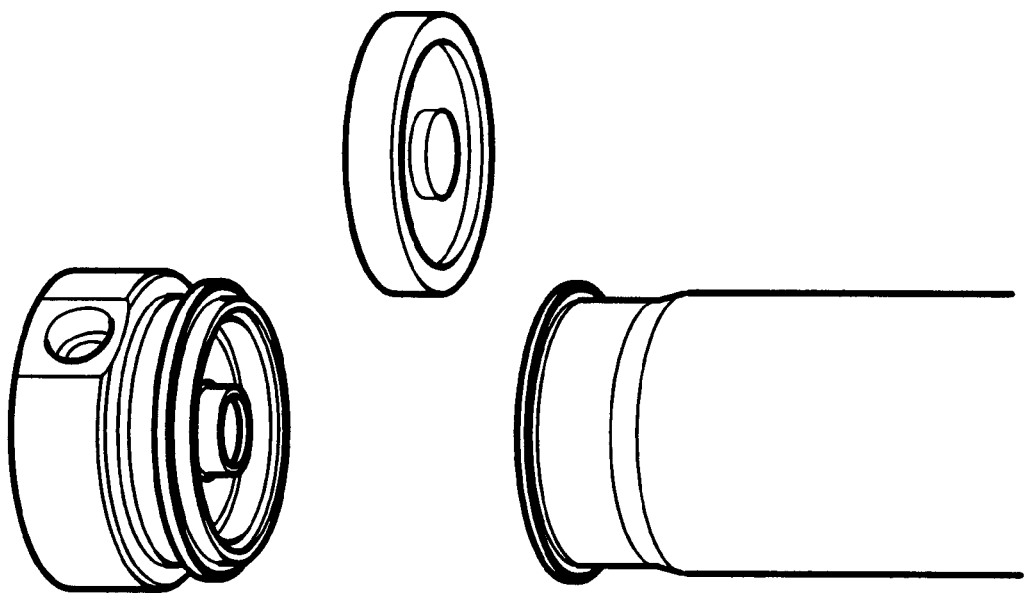
Figure 3D:
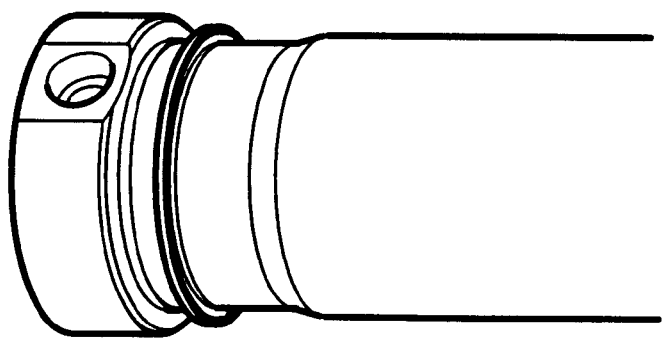

Referring to FIGS. 3a–d, a method by which the instant invention is manufactured is illustrated. First, (FIG. 3a) end cap 22 and shell 20 are spaced away from the hot plate welder 30 (at a temperature of 525° F., which varies between materials as is well known). In FIG. 3b, shell 20 and end cap 22 are pushed into welder 30 (for about 8–14 seconds, which varies between materials as is well known). In FIG. 3c, end cap 22 and shell 20 are disengaged from welder 30. In FIG. 3d, cap 22 and shell 20 are pushed together (for about 10 seconds, which varies between materials as is well known), thereby forming the thermoplastic unibody contactor being free of O-rings and clamps.

A contactor made with O-rings and clamps (4" diameter) typically fails a hydrostatic pressure test at about 200 psig. The inventive contactor typically fails the hydrostatic pressure test at over 400 psig.

The present invention may be embodied in others specific forms without departing from the spirit or essential attributes thereof and, accordingly, a reference should be made to the appended claims, rather than to the foregoing specification, as indicating the scope of the invention.

We claim:

1. A unibody transfer device comprising:

a membrane unit, said unit comprising a membrane, a tube sheet formed of a polyolefin potting resin, and said tube sheet potted to said membrane at an end of said unit;

a polyolefin housing surrounding said unit, said housing comprising a polyolefin end cap and a polyolefin shell wherein said cap, said shell, and said tube sheet are butt welded together, said butt weld excluding glue or adhesive; and said device being free of o-rings and clamps.

2. A method of making a unibody transfer device comprising the steps of:

forming a bundle of a membrane having ends potted with a polyolefin resin:

inserting the bundle into a polyolefin shell;

butt welding a polyolefin end cap to the bundle and the shell, whereby the end cap, the bundle, and the shell are butt welded together, said butt weld excluding glue or adhesive; and thereby forming the device free of o-rings and clamps.

3. The method according to claim 2 wherein said butt welding is hot plate welding.

4. A method of making a unibody transfer device comprising the step of:

forming a bundle of a membrane having ends potted with a polyolefin resin;

providing a polyolefin weld piece at the potted end of the bundle;

inserting the bundle into a shell;

butt welding an end cap to the bundle and shell, whereby the end cap, the bundle, and the shell are butt welded together via the weld piece, said butt weld excluding glue or adhesive; and thereby forming the device free of o-rings and clamps.

5. The method according to claim 4 wherein said butt welding is hot plate welding.

\* \* \* \* \*